United States Patent [19]

Golde

[11] 4,364,483

[45] Dec. 21, 1982

[54] CHILD PROOF SCREW CAP

[76] Inventor: Erich Golde, Auf der Landwehr 4, 3280 Bad Pyrmont, Fed. Rep. of Germany

[21] Appl. No.: 282,235

[22] Filed: Jul. 10, 1981

[30] Foreign Application Priority Data

Feb. 2, 1981 [DE] Fed. Rep. of Germany ....... 3103414
Mar. 16, 1981 [DE] Fed. Rep. of Germany ....... 3110152
May 11, 1981 [DE] Fed. Rep. of Germany ....... 3118592

[51] Int. Cl.³ .............................................. B65D 55/02
[52] U.S. Cl. .................................................... 215/218
[58] Field of Search ............... 215/214, 217, 218, 219, 215/220

[56] References Cited

U.S. PATENT DOCUMENTS 3,526,332 9/1970 Adellerger ........................ 215/214

Primary Examiner—George T. Hall

Attorney, Agent, or Firm—Wells & Wells

[57] ABSTRACT

A child-proof screw-cap for containers having outer threads on the neck. The screw-cap has an inner thread which screws onto the outer thread of the neck and it is opened by an axial pressure in addition to a rotational pressure. The inside wall of the closure cap (1) has a plurality of stakes (3) extending parallel to the closure axis and joined by a common cover plate (2) actuatable from above. The stakes are guided in grooves (5) on the inside of the cap and are provided with threads 3a. Clearances (6) are provided in the outer threads and these clearances have a width greater than the stakes. At least one set of threads 3a of the stakes must be brought into mesh with the outer threads by axial pressure when the stake passes a clearance (6) and a stop is provided at the bottom of a clearance at the closed position to reverse the thrust of the axial pressure to demesh the threads and prevent turning.

21 Claims, 16 Drawing Figures

CHILD PROOF SCREW CAP

The invention concerns a childproof screw-cap for such containers as bottles, pillboxes or the like, consisting of an inside-threaded closure cap for screwing on an external thread of the container and which can be opened only by additionally exerting an axial pressure on the cap.

In known closure means of this sort the screw-cap is provided with an inside cap relatively rotatable to it and comprising the inside thread. An indexing junction is provided between the outer and inside caps, by means of which on one hand the inside cap is carried along only when the outside cap is rotated in the direction of closure, while on the other hand for normal handling and when rotating in the direction of opening the inside cap will not rotate along and the closure means accordingly remains closed. The connection between the outer and inside caps during a rotation in the direction of opening is implemented by a simultaneous pressure on the outside cap, so that opening requires the simultaneity of rotation and axial pressure.

It is a drawback in this regard that opening such a closure means requires considerable manual dexterity which cannot always be provided, especially where the elderly are involved. On the other hand the possibility cannot be dismissed that a child at play may open such closure means when experimenting over a substantial time with the opening of such a closure means.

It is therefore the object of the invention to so design a closure means of the initially cited kind that it can only be opened by adults without requiring especial manual dexterity.

This problem is solved by the invention in that the inside wall of the closure cap is provided with several stakes distributed across its circumference, extending parallel to the closure axis and connected by a common cover plate actuable from the upper side of the closure cap, said stakes being displaceably guided in grooves in the inside wall of the closure cap and equipped on their inside with threads matching the thread of the closure cap, the outside thread comprising clearances at the container neck which are parallel to the closure axis and of a width exceeding the width of the stakes and of which the angular spacing corresponds to that of the stakes, two indexing positions being provided for the component consisting of the stakes and the cover cap, the threads of the stakes meshing with the threads in the closure cap in the first indexing position while being offset from them by about half a pitch when in the second, where the first indexing position can be achieved by an axial pressure on the cover plate in the direction toward the container and the second indexing position is obtained by stop means acting on the stakes and/or the cover plate at the end of the closing motion of the closure cap.

This arrangement achieves that for a mutual position of the parts corresponding to the first indexing position, the closure cap can be normally screwed onto the container neck until the stop means are reached at the end of the closing motion, whereby the cover plate together with the stakes will be shifted away into the second indexing position. In this indexing position the threads of the stakes are offset by about half a pitch from those in the closure cap inside wall within the clearances, so that presently the cross-sections of the thread-teeth in the stakes in the region of the clearances are opposite the thread-teeth of the outer thread at the container neck. Thus the closure cap is stopped and no longer can be turned back.

To open the closure means requires a pressure on the cover plate in the direction of the container, whereby the location shifts from the second to the first indexing position wherein the threads of the stakes again mesh with those of the inside wall of the closure cap. When the parts are so mutually located, the closure cap again can be opened.

As now it is possible to so design the indexing that a more than insignificant pressure must be exerted to pass from the second into the first indexing position, the design can be so implemented that the closure means cannot be opened by children. Nevertheless opening will require no special manual dexterity because the application of the axial pressure and the rotation for the purpose of opening can be applied independently from one another.

In spite of these advantages the closure means of the invention allows being very simple in design and in particular may consist merely of two components, namely the closure cap on one hand and the cover plate with the stakes on the other.

It is especially advantageous to make the stop means in the forms of cogs mounted in the area of the clearances to a peripheral flange of the container neck and provided with bevel surfaces extending in the direction of closure toward the closure cap and acting on the free ends of the stakes. In this manner one obtains in a simple way that at the end of the closing motion, the free ends of stakes move onto the cogs where the stakes due to the positions of the cogs in the region of the clearances are meshing with the threads at the container neck, so that due to the cog effects they may move within their grooves and within the clearances away from the container into the second indexing position. This shifting motion will be facilitated when the free ends of the stakes are provided with bevel surfaces corresponding to the bevel surfaces of the cogs.

When the second indexing position is reached, the closure cap no longer can be rotated in the closing direction because the above described stop means again prevent it. In order to achieve if desired a given pre-stressing of the closure means in the direction of closing, the clearances appropriately should be about twice the width of the stakes and the cogs should be highest in the area of the clearances rear sides as seen in the direction of closing.

On their side away from the container, the cogs also may comprise a levelled surface on which mount the ends of the stakes and where they remain in the closed position. It is possible in this manner to prevent depressing the cover plate in the closed position, rather a reverse rotation in the opening direction of the closure cap is required to that effect. Additional safety is provided in this manner.

Advantageously the cover plate overlaps an upper closure plate of the closure cap, which is provided with passageways for the stakes. While such a closure plate for the closure cap may be eliminated and the cover plate can form the closure plate of the closure cap itself, sealing problems might arise thereby, in particular when, by means of the stakes, the cover plate is moved in the described manner into the second indexing position.

The stop means may be formed also by bevels at the beginning of the particular first upper thread at the container neck on the rear side of clearances as seen in the direction of closing, where a cog provided with a corresponding bevel and exceeding the width of the particular stake is associated with said clearances at the stakes. Such an arrangement offers the advantage of permitting a shortening of the closure cap and of the container neck and hence a saving in material and weight.

Both the bevels at the cog mounted on the flange of the container neck and those at the first threads may subtend an angle of about 60° with the closure axis, whereby a slight ascent of the stakes on the bevels is made possible.

The indexing can be implemented in a variety of ways. For instance slits in the outside wall of the closure cap to form elastic tongues may be provided, where these tongues may comprise two projections or recesses one above the other and spaced apart by about half a pitch, said projections or recesses pointing toward the stakes and engaging corresponding projections or recesses of the stakes for the purpose of bringing about the two indexing positions. This approach however entails touching the closure cap itself, whereby as a rule and for optical reasons an additional casing will be required.

Another embodiment eliminates this requirement, namely where the upper side of the closure cap is provided with an upwardly directed, hollow cylindrical rim engaged by the cover plate, the inside wall of the hollow cylindrical rim of the closure cap being provided with projections or recesses at a spacing of half a pitch which engage corresponding projections or recesses at the rim of the cover plate for the purpose of bringing about the two indexing positions. Such an arrangement may turn out relatively stiff, depending on the size of the projections or recesses or on the material being used, because the cover plate in this case can only be shaped in the manner of a cup spring. Nevertheless simple and easily manufactured components are obtained in this manner.

Lastly another embodiment offers greater latitude, wherein the upper sealing plate of the closure plate is provided with a central pot-shaped recess engaged by indexing tongues at the cover plate, the inside wall of the pot-shaped recess being provided with projections or recesses arranged at half a pitch spacings and engaging corresponding projections or recesses on the outside of the indexing tongues for the purpose of bringing about the two indexing positions. In this manner the indexing can be optimally designed as a function of the longer cross-section of the indexing tongues. Advantageously four circularly arranged indexing tongues are provided as in this manner a uniform support will be ensured during the actuation of the cover plate.

Advantageously two mutually opposite stakes are provided at the cover plate. Such an arrangement moreover offers the possibility to achieve a double thread in the closure cap and the stakes, whereby a wrong assembly of the cover plate with stakes and closure cap no longer is possible because it will not matter which of the stakes was placed in which groove of the closure cap. This facilitates especially automated assembly.

Advantageously the parts of the screw cap consist of a thermoplastic permitting injection-molding and the closure cap on one hand and the cover plate with the stakes on the other hand are combined into a single injection-molded component by joining both parts at their upper sides when in the injection state. In this way the closure cap of the invention can be manufactured practically in two operational steps.

In order to secure hermeticity in spite of the above described locking of the closure means, advantageously the upper closure plate of the closure cap comprises a hollow sealing cone directed toward the container and which in the closed state engages the container neck. The sealing cone also may form the end of a hollow cylinder entering the container neck, whereby the sealing surface is correspondingly enlarged in the closed state.

Another or possibly additional way is to arrange an elastic seal between the inside of the upper closure plate of the closure cap and the rim of the container neck.

The stakes and the grooves may be dovetailed in cross-section, the wider side of the dovetail being outward. In this manner the stakes are guided securely within the inside wall of the closure cap, whereby they cannot bend inward when the closure cap is open. This allows making the stakes relatively thin. It is also possible to make the dovetailed cross-section curved to correspond to the diameter of the closure cap.

The invention is discussed more comprehensively below in relation to the illustrative embodiments of the drawing.

Figure 1:
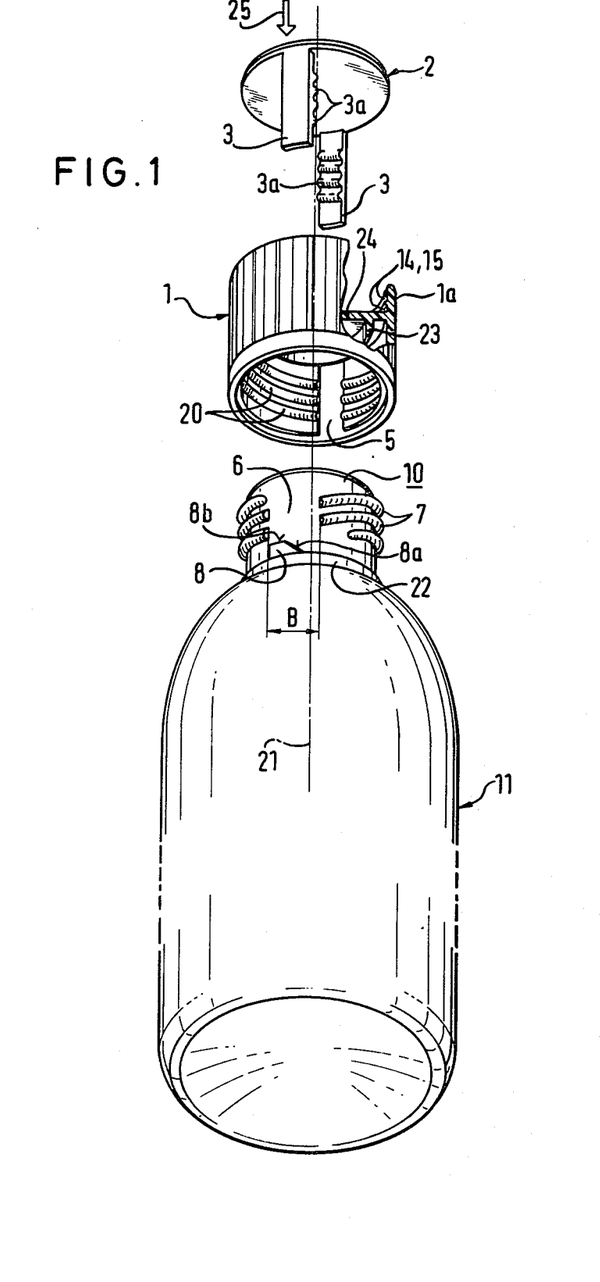
FIG. 1 is a perspective of an embodiment of the screw-cap of the invention seen obliquely from below.

In FIG. 1 a container 11 is provided of which the neck 10 comprises an outside thread 7. A closure cap 1 provided with an inside thread 20 can be screwed onto the container neck 10. The inside thread 20 is interrupted by two grooves 5 in the inside wall of the closure cap 1, the grooves 5 receiving two stakes 3 mounted in a common cover plate 2 and pointing to the container 11. The stakes 3 are provided on their inside with the threads 3a matching the inside thread 20 of the closure cap 1. The outside thread 7 at the container neck 10 is provided with clearances 6 parallel to the closing axis, 21 and of a width B exceeding the width of the stakes 3, whereby the closure cap 1 can both be moved within the clearances 6 when the stakes 3 are inserted and, with respect to their thread positions, offset. The upper side of the closure cap 1 is provided with the upwardly directed hollow cylindrical rim 1a (FIGS. 14 and 15) engaged by the cover plate 2 for the inserted condition, the inside wall of the hollow cylindrical rim 1a of the closure cap 1 being provided with projections or recesses 14 and 15 at a spacing of half a pitch which engage corresponding projections or recesses at the rim of the cover plate 2. The circumferential rim of the cover plate 2 also itself can form the projection engaging the indexing grooves.

Two indexing positions are created in such a manner, in the first of which the threads 3a in the stakes 3 mesh with the threads of the inside thread 20 in the closure cap 1, while in the second one they are relatively offset by half a pitch. The first indexing position is brought about by axial pressure on the cover plate 2 in the direction of the container 11. To bring about the second indexing position and as regards the embodiment of the FIG. 1, cogs 8 are arranged on a circumferential flange 22 of the container neck 10, these cogs being in the area of the clearances 6. The cogs 8 comprise bevelled surface 8a extending as seen in the direction of closing toward the closure cap 1 and acting on the free ends of the stakes 3.

Also, that side of the cog 8 which is away from the container 11 is provided with a flat surface 8b on which the free ends of the stakes 3 can rest in the closed state.

Figure 2:
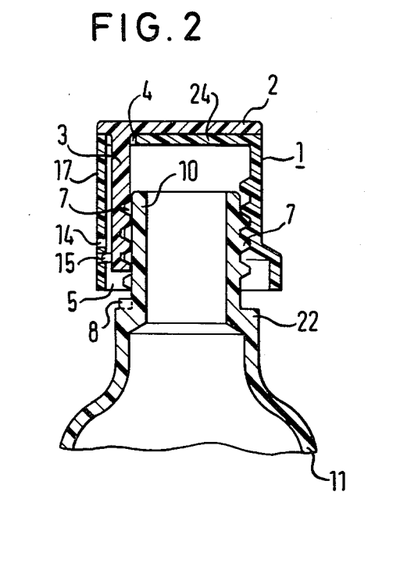
FIG. 2 is a sideview cross-section of the screw-cap of FIG. 1 for a somewhat modified embodiment during the closing motion.
Figure 3:
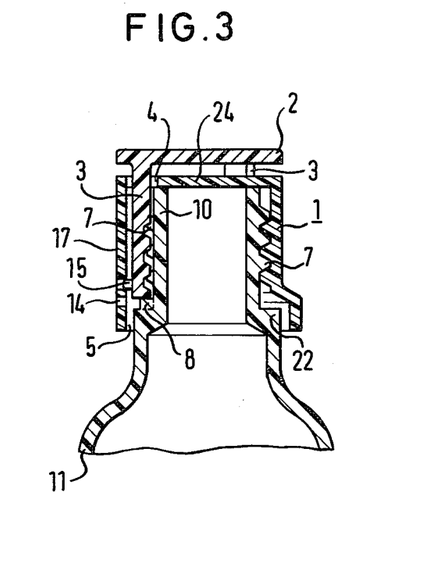
FIG. 3 is the cross-section of FIG. 2 at the end of the closing motion.
Figure 4:
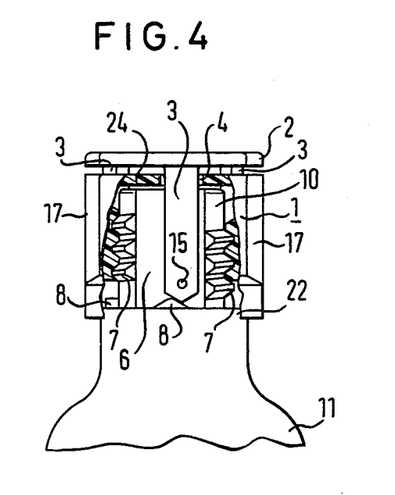
FIG. 4 is the closure means of FIG. 3 seen from the left in partly exploded view.
Figure 5:
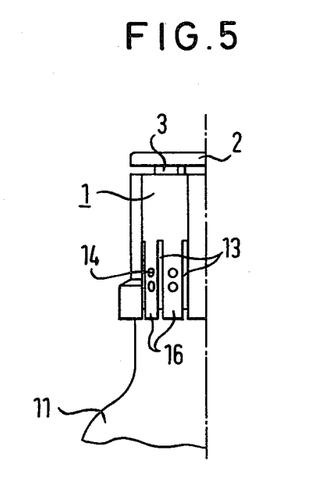
FIG. 5 is a partial sideview of the closure means seen from the outside.

Lastly a sealing cone 23 may be noted inside the closure cap 1 of FIG. 1, which is mounted on the inside of an upper closure plate 24 of the closure cap 1 and which in the closed state acts in a sealing manner on the container neck 10. The upper closure plate 24 is provided with passageways 4 (FIG. 2) to let the stakes 3 through when the component consisting of the stakes 3 and the cover plate 2 is set up.

The arrangement described above operates as follows:

After the stakes 3 have been set into the grooves 5 and after the cover plate 2 has been placed in the space within the hollow cylindrical rim 1a, and following the forcing of the cover plate into the first—and as regards FIG. 1 the lower—indexing position, the closure cap can be screwed onto the outside thread 7 of the container neck 10. At the end of the closing process the free ends of the stakes 3 hit the bevel surfaces 8a of the cogs 8 and hence run up these cogs 8. Thereby the stakes are shifted by half a pitch upward in FIG. 1 into the second indexing position. At the same time the free ends of the stakes 3 are above the flat surfaces 8b. In this position the cross-sections of the teeth of the threads 3a of the stakes 3 are opposite the cross-sections of the teeth of the outer thread 7 at the container neck 10, whereby a reverse rotation of the closure cap 1 is possible only until the teeth of the threads 3a of the stakes 3 hit the threads 7 which limit the clearance 6 on the first side as seen in the direction of closing and on the right-hand side in FIG. 1.

In this closure position, the sealing cone 23 engages with prestressing the container neck, whereby hermeticity is ensured.

To open the closure means, the closure cap 1 must first be rotated back until the free ends of the stakes 3 have been removed from the flat surface 8b of the cog 8. Thereupon a pressure is exerted on the cover plate in the direction of the arrow 25, whereby the cover plate and the stakes are displaced in the same direction toward the container 11 and the first indexing position is arrived at again. In this first indexing position, the threads 3a of the stakes 3 again mesh with the threads of the inside thread 20 of the closure cap 1, whereby latter can be screwed off.

Another kind of indexing is provided by the embodiment shown in FIGS. 2 through 5. This indexing consists—as especially shown by FIG. 5—in providing slits 13 in the outside wall of the closure cap 1 in order to form elastic tongues 16 comprising two projections or recesses 14 and 15 resp. arranged one above the other at a spacing of about half a pitch and pointing toward the stakes 3, and engaging corresponding projections or recesses of the stakes 3 for the purpose of bringing about the two indexing positions. In the embodiments shown in the FIGS. 2 through 5, the recesses are arranged in the stakes 3 and denoted by 15, one projection being located in each case on the outsides of the stakes.

Moreover the embodiment of FIGS. 2 through 5 comprises three stakes 3 arranged at equal angular spacings, the grooves 5 to receive the stakes 3 being arranged in bulges 17 of the closure cap 1.

Lastly, as regards this embodiment, the cogs 8 are arranged at the center of the bulges 6 and bevelled on both sides, so that, contrary to the case of the arrangement of FIG. 1, the cover plate 2 can also be depressed when in the closed state and hence the stakes 3 can be downwardly displaced.

Figure 7:
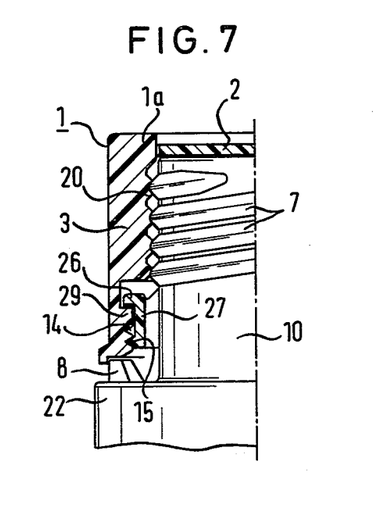
FIG. 7 is the partial-section VII—VII of FIG. 6 when the container neck is not sectioned.
Figure 8:
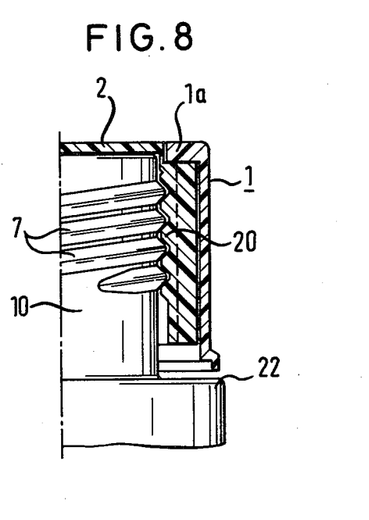
FIG. 8 is the partial section VIII—VIII of FIG. 6 when the container neck is not sectioned.
Figure 9:
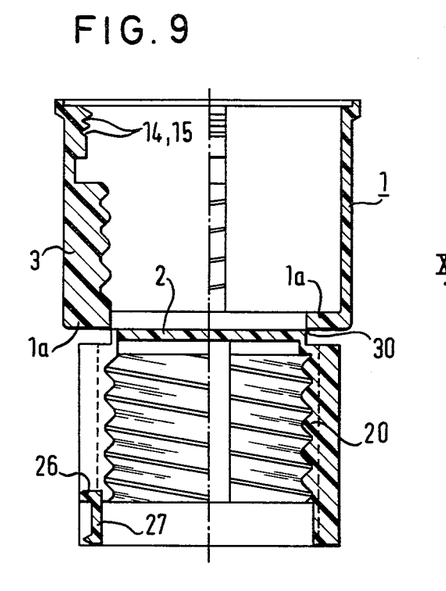
FIG. 9 shows the parts of the closure means of the FIGS. 6 through 8 in the injection-molding state, the left side in FIG. 9 corresponding to the section VII—VII of FIG. 6 and its right side to the section VIII—VIII of FIG. 6.

The FIGS. 7 through 9 show an embodiment wherein the stakes 3 are joined to the outer casing of the closure cap 1 while the two sections of the inside thread 20 are connected to the cover plate 2. The projections and recesses 14 and 15 spaced half a pitch apart are located at the lower end of the stakes while the matching index means are located at wall segments 27 bounded by the walls 28 forming the guide grooves 5 for the stakes. When rising on the cogs 8, the stakes 3 therefore are forced upward together with the outer casing of the closure cap until an indexing beak 26 in the wall segments 27 hits a bearing means 29 in the area of the stakes. To open this closure means therefore requires a pressure on the outer hollow cylindrical rim 1a of the closure means.

In this embodiment, wherein therefore the cover plate 2 directly faces the free end of the container neck 10, and wherein the sealing elements in the form of a sealing cone or a sealing ring may be mounted between those two parts, a further additional closure plate can be eliminated.

Figure 6:
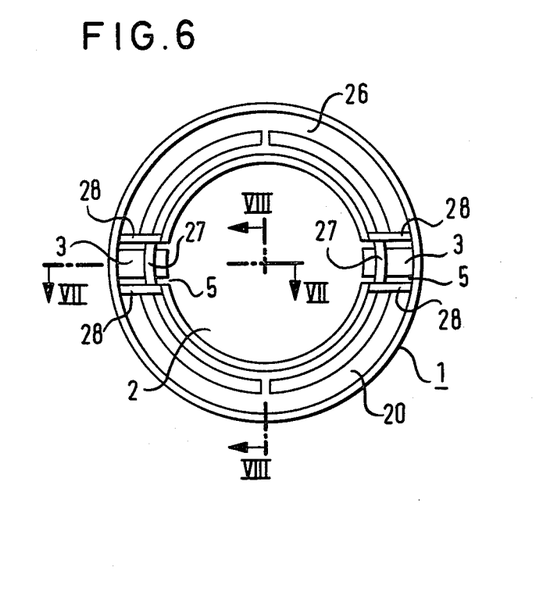
FIG. 6 is another embodiment of the closure means seen from below.

FIG. 9 shows the parts of the closure means of the FIGS. 6 through 8 in the injection-molding state. As shown, the closure cap 1 is combined into a single injection-molded part with the stakes 3, and the cover plate 2 with the inside thread 20, by joining the two parts at their particular upper sides while in the injection-molding state. The common injection-molding sprue—which will be cut off at ejection—may be located at 30. One of the parts will be turned over and both parts are mutually inserted after ejection.

The combination into a single injection-molded part per FIG. 9 appropriately also applies to all the other embodiments, where the one part will be formed by the closure cap 1 provided with the inside thread and the other part by the cover plate with the stakes. In these embodiments too the two parts in a certain way are united while upside down into a common injection-molding part and are injection-molded in one operation.

Figure 10:
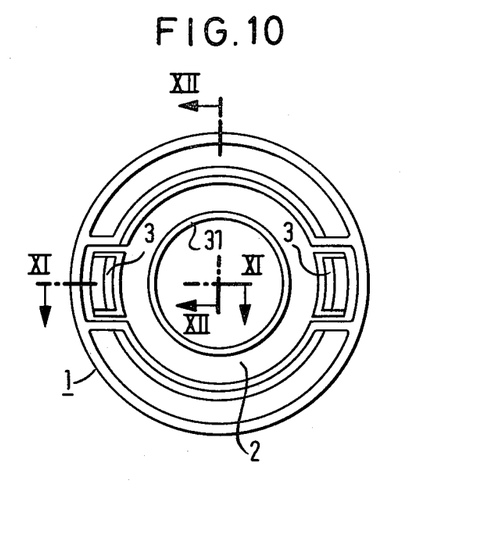
FIG. 10 shows another embodiment of the closure means seen from below.
Figure 11:
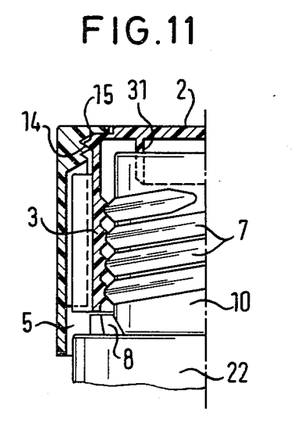
FIG. 11 is the partial section XI—XI of FIG. 10 when the container neck is not sectioned.
Figure 12:
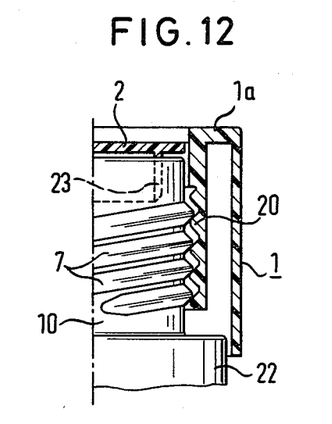
FIG. 12 is the partial section XII—XII of FIG. 10 when the container neck is not sectioned.

The FIGS. 10 through 12 show an embodiment wherein again the cover plate 2 is joined to the stakes 3 and the inside-thread sections 20 with the outer casing of the closure cap 1. The indexing projections and recesses 14 and 15 in this case—as also in the case of FIG. 1—are located within the hollow cylindrical rim 1a of the closure cap 1. In this embodiment the sealing cone 23 engaging the container neck 10 is located at the end of a hollow cylinder 31 which also engages the container neck 10, whereby the sealing is achieved in sufficiently extensive manner before the termination of the closure motion.

The embodiment of the FIGS. 10 through 12 permits joining the two closure parts into a single injection-molding component in the manner already described.

Figure 13:
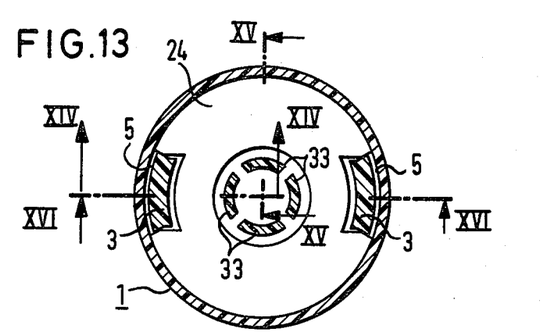
FIG. 13 is the section XIII—XIII of FIG. 14 for another embodiment of the closure means of the invention.
Figure 14:
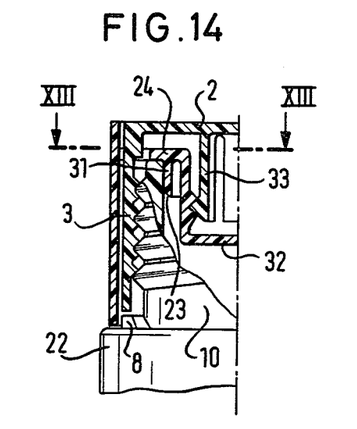
FIG. 14 is the partial section XIV—XIV of FIG. 13.
Figure 15:
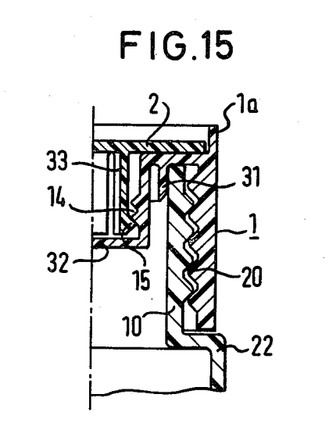
FIG. 15 is the partial section XV—XV of FIG. 13.

The FIGS. 13 through 16 show another modified embodiment. As indicated by FIGS. 14 and 15, an upper closure plate 24 is provided which comprises a pot-shaped recess 32 engaged by indexing tongues 33 mounted to the outer cover plate 2. The inside wall of the pot-shaped recess 32 is provided with projections or clearances 14 and 15 resp. arranged at a spacing of half a pitch and engaging corresponding projections or recesses on the outside of the indexing tongues 33. As shown by FIG. 13, four circularly arranged indexing tongues 33 are provided.

As shown by the FIGS. 14 and 15, the pot-shaped recess 32 may be enclosed by the sealing cone 23 engaging the container neck 10 and mounted at the end of the hollow cylinder 31. As further shown by FIG. 13, the stakes 3 and the associated grooves 5 may evince a dovetailed cross-section, where the wider side of the dove-tail is external. This dovetail cross-section may be designed to be curved to correspond to the diameter of the closure cap 1.

Figure 16:
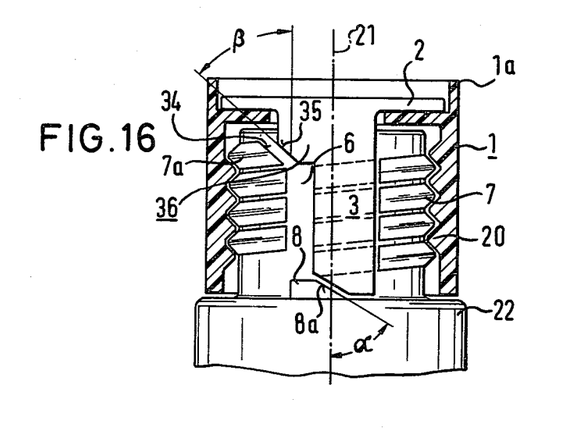
FIG. 16 is the partial section XVI—XVI of FIG. 13 when the container neck and the cover plate are not sectioned.

FIG. 16 is the partial section XVI—XVI of FIG. 13, only the closure cap 1 being shown in section. As shown by FIG. 16, the bevels at the cogs 8 subtend an angle alpha of about 60° with the closure axis 21, whereby an easy ascent on the cogs 8 is ensured.

The embodiment shown in FIG. 16 furthermore provides bevels 34 at the beginning of the particular first thread 7a at the container neck on the rear side—as seen in the direction of closing—of the clearances 6, which are associated with a cog 36 at the stakes 3 which is provided with a corresponding bevel 35 and which projects beyond the width of the particular stake 3. These bevels 34 also may subtend an angle beta—also of about 60°—with the closure axis, which means that they may replace the cog 8 whereby the height of closing can be reduced.

I claim:

1. A child-proof screw-cap for such containers as bottles, pill boxes and the like, consisting of a closure cap with an inside thread screwing on an outer thread of the container neck and which can be opened only by exerting an axial pressure on, in addition to the rotational motion of the closure cap, characterized in that the inside wall of the closure cap (1) is provided with a plurality of stakes (3) distributed over its circumference and extending parallel to the closure axis (21) and joined by a common cover plate (2) which can be actuated from the upper side of the closure cap (1), said stakes (3) being displaceably guided in grooves (5) in the inside wall of the closure cap (1) and being provided on their inside with threads meshing with the inside thread (20) of the closure cap (1), the outside thread (7) at the container neck (10) being provided with clearances (6) extending parallel to the closure axis (21) and of which the given width (B) exceeds the width of the stakes (3) and of which the angular spacing corresponds to that of the stakes (3), where furthermore two indexing positions are provided for the component consisting of the stakes (3) and the cover plate (2), in the first of which the threads (3a) in the stakes (3) mesh with the threads of the inside thread (20) in the closure cap (1) while in the second indexing position they are relatively offset by about half a pitch and where the first indexing position can be brought about by axial pressure on the cover plate (2) in the direction of the container (11) and the second indexing position can be brought about by stop means (8) which at the end of the closing motion of the closure cap (1) act on the stakes (3) and/or the cover plate (2).

2. Screw-cap per claim 1, characterized in that the stop means are formed by cogs (8) mounted in the area of the clearances (6) to a peripheral flange (22) of the container neck (10) and provided with bevel surfaces (8a) extending in the direction of the closure cap (1) and acting on the free ends of the stakes (3).

3. Screw cap per claim 2, characterized in that the clearances (6) are about twice the width of the stakes (3) and in that the cogs (8) are highest in the area of the rear side of the clearances (6) as seen in the direction of closing.

4. Screw-cap per claim 2, characterized in that the side of the cogs (8) facing away from the container (11) is provided with a flat surface (8b).

5. Screw-cap per claim 2, characterized in that the free ends of the stakes (3) are provided with bevel surfaces corresponding to the bevels (8a) of the cogs (8).

6. Screw-cap per claim 1, characterized in that the cover plate (2) spans beyond an upper closure plate (24) of the closure cap (1) and is provided with passageways (4) for passing the stakes (3).

7. Screw-cap per claim 1, characterized in that the stop means are formed by bevels (34) at the beginning of the particular first upper thread (7a) at the container neck (10) on the rear side—as seen in the direction of closing—of the clearances (6) which are associated with a cog (36) mounted to the stakes (3) and provided with a corresponding bevel surface (35) and spanning beyond the width of the particular stake (3).

8. Screw-cap per claim 7, characterized in that the bevel surfaces (8a) of the cogs (8) or of the upper first thread (7a) subtend an angle of about 60° with the closure axis (21).

9. Screw-cap per claim 1, characterized in that slits (13) are provided in the outside wall of the closure cap (1) in the area of the stakes (3) for the purpose of forming elastic tongues (16) which comprise two projections or recesses (14,15) toward the stakes (3) and are placed one over the other at a spacing of about half a pitch and which engage corresponding projections or recesses (14,15) of the stakes (3) for the purpose of bringing about the two indexing positions.

10. Screw-cap per claim 8, characterized in that the upper side of the closure cap (1) is provided with an upwardly directed, hollow cylindrical rim (1a) engaged by the cover plate (2), the inside of the hollow cylindrical rim (1a) of the closure cap (1) being provided with projections or recesses (14,15) arranged at a spacing of half a pitch and engaging corresponding projections or recesses (14,15) at the rim of the cover plate (2) for the purpose of bringing about the two indexing positions.

11. Screw-cap per claim 8, characterized in that the upper closure plate (24) of the closure cap is provided with a central, pot-shaped recess (32) engaged by indexing tongues (33) at the cover plate (2), the inside wall of the pot-shaped recess (32) comprising projections or recesses (14,15) arranged at a spacing of half a pitch and engaging corresponding projections or recesses (14,15) on the outside of the indexing tongues (33) for the purpose of bringing about the two indexing positions.

12. Screw-cap per claim 11, characterized in that four circularly arrayed indexing tongues (33) are provided.

13. Screw-cap per claim 1, characterized in that two mutually opposite stakes (3) are provided at the cover plate (2).

14. Screw-cap per claim 13, characterized in that the threads in the closure cap (1) and the stakes (3) are double-threads.

15. Screw-cap per claim 1, characterized in that the parts of the screw-cap consist of an injection-moldable thermoplastic and in that the closure cap (1) on one hand and the cover plate (2) with the stakes (3) on the other hand are combined into a single injection-molded article by joining the two parts together by their upper sides when in the injection-molding state.

16. Screw-cap per claim 1, characterized in that the upper closure plate (24) of the closure cap (1) comprises a hollow sealing cone (23) directed toward the container (11) and which in the closed state engages the container neck (10) in a sealing manner.

17. Screw-cap per claim 16, characterized in that the sealing cone (23) forms the end of a hollow cylinder (31) engaging the container neck.

18. Screw-cap per claim 1, characterized in that an elastic seal is mounted between the inside of the upper closure plate (24) of the closure cap (1) and the rim of the container neck (10).

19. Screw-cap per claim 1, characterized in that the stakes (3) and the grooves (5) evince a dovetailed cross-section, with the wider side of the dovetail being on the outside.

20. Screw-cap per claim 19, characterized in that the dovetailed cross-section is designed in curved manner corresponding to the diameter of the closure cap (1).

21. Screw-cap per claim 1, characterized in that in each case the stakes (3) form one component with the outside casing of the closure cap (1), and the inside thread (20) with the cover plate (2) form one component, where the outside casing with the stakes can be acted on by the stop means (8) on one hand and the actuation pressure on the other.

* * * * *